United States Patent
Park et al.

(10) Patent No.: US 11,765,108 B2
(45) Date of Patent: Sep. 19, 2023

(54) METHOD, COMPUTER DEVICE, AND NON-TRANSITORY COMPUTER READABLE RECORDING MEDIUM TO DISPLAY GROUPED IMAGE MESSAGE

(71) Applicant: LINE Plus Corporation, Seongnam-si (KR)

(72) Inventors: Sung Ho Park, Seongnam-si (KR);
Heeyoung Jeon, Seongnam-si (KR);
Byungkook Jang, Seongnam-si (KR);
Jong Min Kim, Seongnam-si (KR);
Eunjeong Lee, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 17/831,035

(22) Filed: Jun. 2, 2022

(65) Prior Publication Data

US 2022/0393995 A1 Dec. 8, 2022

(30) Foreign Application Priority Data

Jun. 3, 2021 (KR) .................. 10-2021-0071870

(51) Int. Cl.
*H04L 51/04* (2022.01)
*G06F 3/0485* (2022.01)
*G06F 3/04817* (2022.01)
*G06F 3/04842* (2022.01)
*G06F 3/04845* (2022.01)

(52) U.S. Cl.
CPC ............ *H04L 51/04* (2013.01); *G06F 3/0485* (2013.01); *G06F 3/04817* (2013.01); *G06F 3/04842* (2013.01); *G06F 3/04845* (2013.01)

(58) Field of Classification Search
CPC ....... H04L 51/04; H04L 51/02; H04L 51/216; G06F 3/04817; G06F 3/04842; G06F 3/04845; G06F 3/0485
See application file for complete search history.

(56) References Cited

U.S. PATENT DOCUMENTS

| 9,185,062 B1 * | 11/2015 | Yang ..................... H04N 23/62 |
| 2020/0099642 A1 * | 3/2020 | Mishima ............... G06F 3/1285 |

(Continued)

FOREIGN PATENT DOCUMENTS

| KR | 10-2002-0074304 A | 9/2002 |
| KR | 10-1331444 B1 | 11/2013 |

(Continued)

OTHER PUBLICATIONS

Babich, "Mobile UX Design: List View and Grid View", Mar. 22, 2016, https://babich.biz/mobile-ux-design-list-view-and-grid-view/ (Year: 2016).*

(Continued)

*Primary Examiner* — Patrick F Riegler
(74) *Attorney, Agent, or Firm* — Sughrue Mion, PLLC

(57) ABSTRACT

A method, a computer device, and a non-transitory computer-readable recording medium are provided to display a grouped image message. An image message display method may include displaying a plurality of grouped images sent and received as an image message in a chatroom as a single message unit; and switching a view mode of the image message in the chatroom in response to a user request.

20 Claims, 9 Drawing Sheets

(56) References Cited

U.S. PATENT DOCUMENTS

2020/0159394 A1* 5/2020 Chassen .............. G06F 3/04845
2022/0294754 A1* 9/2022 Rozenbaum ............ H04L 51/08
2022/0353225 A1* 11/2022 Shen ....................... H04L 51/04

FOREIGN PATENT DOCUMENTS

KR    10-2017-0021616 A    2/2017
KR    10-2017-0076380 A    7/2017

OTHER PUBLICATIONS

Office Action dated Feb. 8, 2023 from the Korean Patent Office in App. No. 10-2021-0071870.

\* cited by examiner

METHOD, COMPUTER DEVICE, AND NON-TRANSITORY COMPUTER READABLE RECORDING MEDIUM TO DISPLAY GROUPED IMAGE MESSAGE

CROSS-REFERENCE TO RELATED APPLICATION

This application claims priority from Korean Patent Application No. 10-2021-0071870, filed Jun. 3, 2021 in the Korean Intellectual Property Office (KIPO), the disclosure of which is incorporated herein by reference in its entirety.

BACKGROUND

1. Field

Apparatuses and methods consistent with example embodiments relate to displaying a message in a chatroom.

2. Description of Related Art

An instant messenger is a general community tool for sending and receiving messages or data in real time. The instant messenger may allow a user to register a contact on a messenger and to send and receive messages with a counterpart included in a contact list.

Due to such a messenger function, the use of a messenger is popular not only in a personal computer (PC) environment but also in a mobile environment of a mobile communication terminal.

SUMMARY

Example embodiments may provide a plurality of view modes for a message configured as a bundle-processed image group.

Example embodiments may display an image message in a mode according to a user selection between a grid mode and a carousel mode without a screen transition in a chatroom.

According to an aspect of at least one example embodiment, there is provided an image message display method implemented by a computer device including at least one processor configured to execute computer-readable instructions included in a memory, the image message display method including, by the at least one processor, displaying a plurality of grouped images sent and received as an image message in a chatroom as a single message unit; and switching a view mode of the image message in response to a user request.

The switching the view mode may include switching the view mode in response to the user request being received via a toggle button presented in the chatroom.

The switching may include: toggling between a grid mode in which the plurality of grouped images are displayed in a grid form and a carousel mode in which the plurality of grouped images are scrollable in a horizontal direction.

The grid mode is a view mode for displaying a thumbnail image, and the carousel mode is a view mode for displaying an original image or an enlarged image of the thumbnail image.

The image message display method may further include: displaying the image message in a default view mode between the grid mode and the carousel mode in response to a user reentering the chatroom after leaving the chatroom when the image message is displayed.

The image message display method may further include: storing a last view mode displayed in the chatroom for the image message; and displaying the image message in the last view mode between the grid mode and the carousel mode in response to reentry into the chatroom.

In the carousel mode, a movement between the plurality of grouped images according to a user input is provided by horizontally arranging the plurality of grouped images.

In the carousel mode, the plurality of grouped images are scrolled regardless of an input size according to a user input.

In the carousel mode, the plurality of grouped images are scrolled in proportion to an input size according to a user input.

The image message display method may further include displaying, in the carousel mode, a scroll indicator according to a movement between the plurality of grouped images.

According to an aspect of at least one example embodiment, there is provided a non-transitory computer-readable recording medium storing computer-readable instructions that, when executed by a processor, cause the processor to perform the image message display method.

According to an aspect of at least one example embodiment, there is provided a computer device including at least one memory storing computer-readable instructions; and at least one processor configured to execute the computer-readable instructions to display a plurality of grouped images sent and received as an image message in a chatroom as a single message unit, and to switch a view mode of the image message in response to a user request.

The at least one processor may be further configured to switch the view mode in response to the user request being received via a toggle button presented in the chatroom.

The at least one processor may be further configured to toggle between a grid mode in which the plurality of grouped images are displayed in a grid form and a carousel mode in which the plurality of grouped images are scrollable in a horizontal direction.

The grid mode is a view mode for displaying a thumbnail image, and the carousel mode is a view mode for displaying an original image or an enlarged image of the thumbnail image.

The at least one processor may be further configured to display the image message in a default view mode between the grid mode and the carousel mode in response to a user entering the chatroom after leaving the chatroom when the image message is displayed.

The at least one processor may be configured to: store a last view mode displayed in the chatroom for the image message, and display the image message in the last view mode between the grid mode and the carousel mode in response to reentry into the chatroom.

In the carousel mode, a movement between the plurality of grouped images according to a user input is provided by horizontally arranging the plurality of grouped images.

In the carousel mode, the plurality of grouped images are scrolled in proportion to an input size according to a user input.

The at least one processor may be further configured to execute the computer-readable instructions to display a scroll indicator according to a movement between the plurality of grouped images are in the carousel mode.

BRIEF DESCRIPTION OF THE DRAWINGS

The above and/or other aspects will be more apparent by describing certain example embodiments, with reference to the accompanying drawings, in which.

Figure 1:
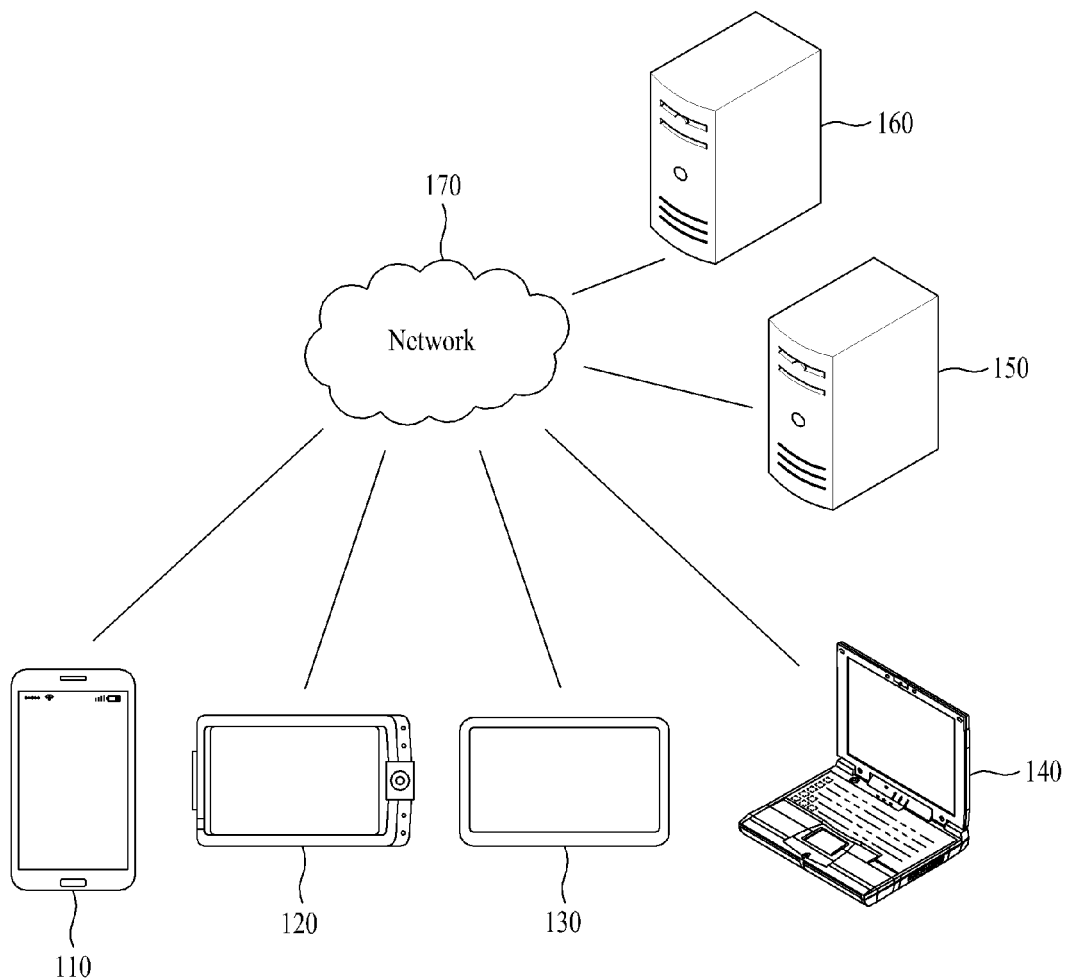
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer recording medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable recording medium into the one or more storage devices and/or one or more computer processing devices using a drive mechanism. Such separate computer readable recording medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable recording medium. Additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to displaying a message in a chatroom.

The example embodiments may provide a plurality of view modes for an image message in a chatroom.

The term "image message" used herein refers to a message corresponding to a single image type among message types that may be sent through a messenger and the like. In particular, in the example embodiment, the image message refers to a message in which at least two messages (e.g., photos) are grouped through bundle processing and regarded as a single transmission unit or a single transmission packet and displayed through a single message user interface (UI) (e.g., a speech bubble).

Although the example embodiment describes an image as content that may be sent as a message, it is provided as an example only. In addition to the image, content to be sent may be bundled or grouped as a single transmission unit. Any types of contents that may be displayed through a single message UI may be expanded and applied.

An image message display system according to some example embodiments may be implemented by at least one computer device. An image message display method according to some example embodiments may be performed by at least one computer device included in the image message display system. Here, a computer program according to an example embodiment may be installed and run on the computer device and the computer device may perform the image message display method according to example embodiments under control of the computer program. The aforementioned computer program may be stored in a computer-readable recording medium to implement the image message display method in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as one example of environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service (e.g., a messenger service) to the plurality of electronic devices 110, 120, 130, and 140 connected over the network 170.

Figure 2:
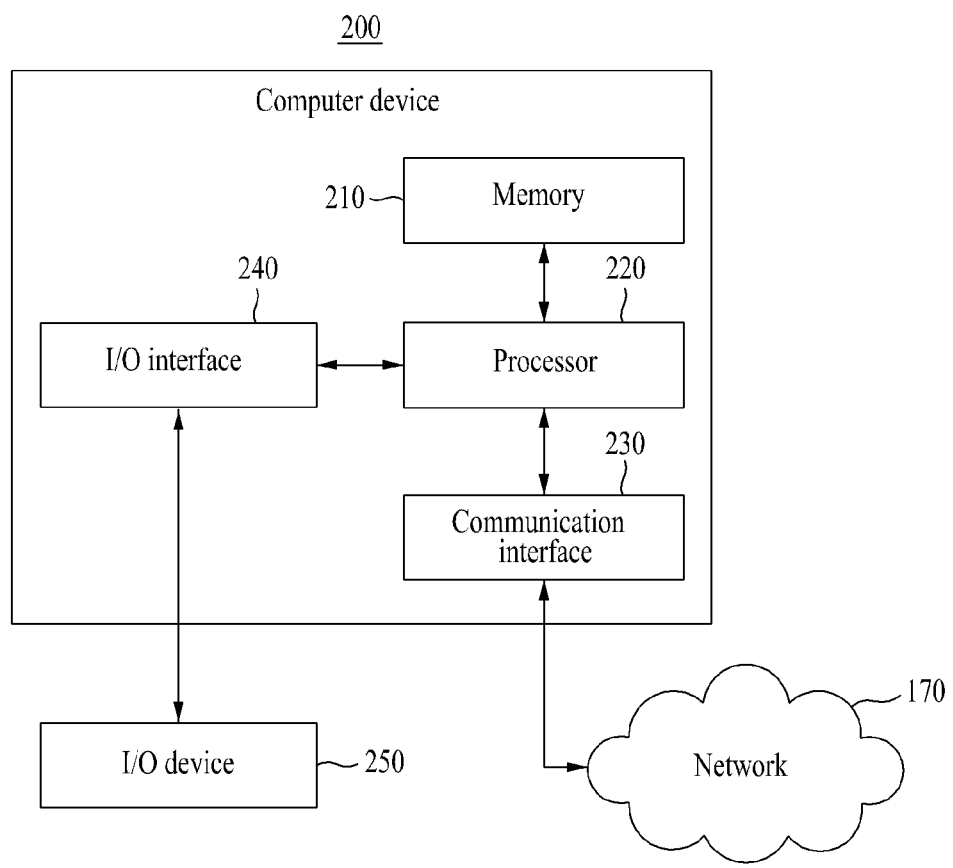
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable recording medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function or a hardware structure for communication between the computer device 200 and another apparatus, for example, the aforementioned storage devices. For example, the processor 220 of the computer device 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interfacing with an I/O apparatus 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O apparatus 250 may be configured as a single apparatus with the computer device 200.

Also, according to other example embodiments, the computer device 200 may include a greater or smaller number of components than the number of components of FIG. 2. However, there is no need to clearly illustrate most conventional components. For example, the computer device 200 may be configured to include at least a portion of the I/O apparatus 250 or may further include other components, such as a transceiver and a database.

Hereinafter, a method and apparatus that may display an image message in a chatroom according to example embodiments will be described.

Figure 3:
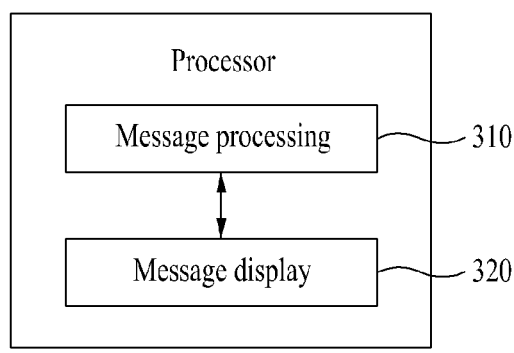
FIG. 3 illustrates an example of a component includable in a processor of a computer device according to at least one example embodiment.
Figure 4:
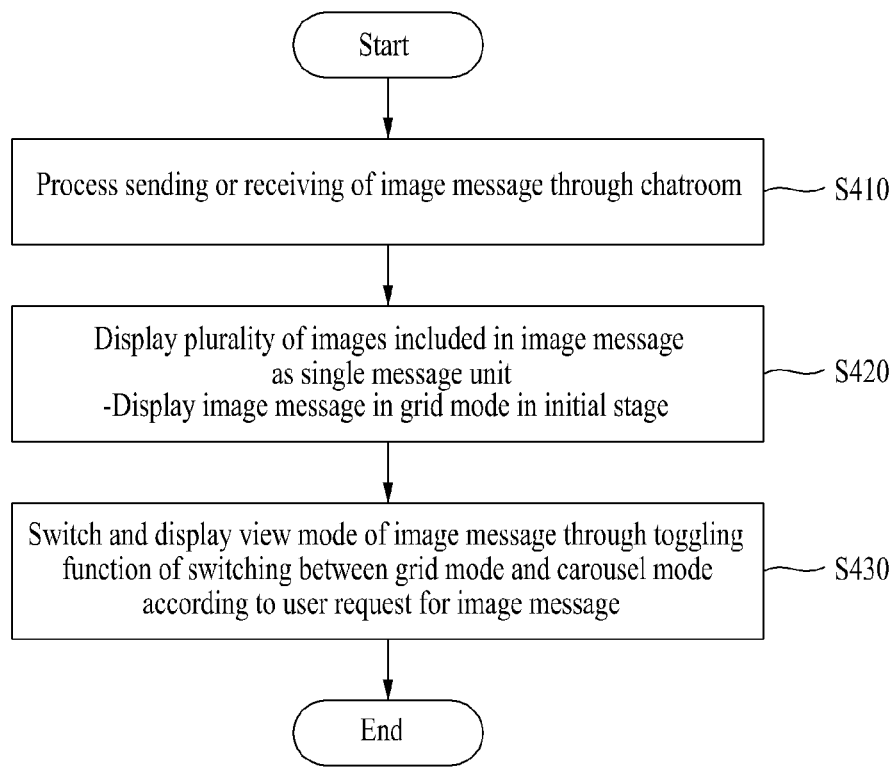
FIG. 4 is a flowchart illustrating an example of a method performed by a computer device according to at least one example embodiment.

FIG. 3 is a diagram illustrating an example of components included in a processor of a computer device according to at least one example embodiment, and FIG. 4 is a flowchart illustrating an example of an image message display method performed by a computer device according to at least one example embodiment.

The computer device 200 according to the example embodiment may provide a messenger service through connection to an exclusive application or a website/mobile site. An image message display system implemented as a computer may be configured in the computer device 200. For example, the image message display system may be implemented in a form of a program that independently operates or may be configured in an in-app form of a specific application to be operable on the specific application.

Referring to FIG. 3, the processor 220 of the computer device 200 may include a message processing component 310 and a message display component 320 as components to perform the following image message display method. Depending on example embodiments, components of the processor 220 may be selectively included in or excluded from the processor 220. Also, depending on example embodiments, the components of the processor 220 may be separated or merged for functional representation of the processor 220.

The processor 220 and the components of the processor 220 may control the computer device 200 to perform operations included in the following image message display method. For example, the processor 220 and the components of the processor 220 may be configured to execute an instruction according to a code of at least one program and a code of an OS included in the memory 210.

Here, the components of the processor 220 may be representations of different functions performed by the processor 220 in response to one or more instructions provided from a program code stored in the computer device 200. For example, the message processing component 310 may be used as a functional representation of the processor 220 that controls the computer device 200 to process transmission and reception of an image message through the chatroom in response to the instruction.

The processor 220 may read instructions for controlling the computer device 200 from the memory 210. In this case, the read instructions may include an instruction for controlling the processor 220 to perform the following image message display method.

Operations included in the following image message display method may be performed in order different from illustrated order. A portion of the operations may be omitted or an additional process may be further included.

Operations included in the following image message display method may be performed by a client device (e.g., an electronic device 110, 120, 130, or 140) in which a messenger is installed. Depending on example embodiments, a portion of operations may be performed by the server 150.

Referring to FIG. 4, in operation S410, the message processing component 310 may perform message sending or receiving process, to display an outgoing or incoming image message through a chatroom. When a user participating in the chatroom desires to send a plurality of images in a batch in the corresponding chatroom, a client device may group the plurality of images through a bundling function and may send the plurality of images as a single message unit. A receiving side client device may receive the plurality of images in a form that is grouped as a single message unit through the chatroom. When sending a message, that is, an image message that includes the plurality of images to an electronic device of each of users participating in the chatroom, the server 150 may also deliver an original image file received from a sending side client device with a thumbnail of each image. The receiving side client device may download the original image file from the server 150 in a background. Here, whether to download the original image file may be determined according to a predetermined condition, for example, a network environment or a setting option of the client device. For example, in a WiFi connection state, the original image file may be automatically received at an incoming point in time of the image message.

In operation S420, when displaying the image message in the chatroom, the message display component 320 may display the plurality of images included in the image message as a single message unit. The term "single message unit" may refer to a single chat bubble, a single text message, a single image message, or a group of images which is selectable by a single click or a single input (for example, to display a larger size of the group of images) in the chatroom. The message display component 320 may display the plurality of images created as an image message type through a single message UI (e.g., a speech balloon). In an initial stage of initially displaying the image message in the chatroom, a view mode of the image message may be displayed as a grid mode. In the grid mode, a corresponding UI layout is configured in a grid form when displaying the image message through a single message UI and a thumbnail of each image is arranged and displayed in the grid form.

In operation S430, in response to an input of a user request for switching a view mode for the image message, the message display component 320 may switch and display the view mode of the image message through a toggling function of switching between a grid mode and a carousel mode according to the user request. In the carousel mode, a message with multiple images or videos may be viewed by swiping or clicking a preset position (e.g., a left or right side) or a preset button (e.g. an arrow button) to scroll the multiple images or videos in a horizontal direction. By arranging and displaying thumbnails in a grid form in the grid mode and by horizontally arranging not thumbnails of images but an original image file, a movement between images may be provided through a predetermined type of input (e.g., a swipe action). Depending on example embodiments, for example, in an environment in which an original image file is not received at a client device, it is possible to implement the carousel mode by enlarging a thumbnail to a fixed size. When a view mode change request is input in a state in which the image message is displayed in the grid mode, the message display component 320 may switch a view mode of the corresponding image message from the grid mode to the carousel mode. When a view mode change request is input in a state in which the image message is displayed in the carousel mode, the message display component 320 may switch the view mode of the corresponding image message from the carousel mode to the grid mode. Here, the message display component 320 may provide view details for the image message without changing a screen through the carousel mode and may display the image message in a view mode according to a user selection through a toggling method between the grid mode and the carousel mode.

When an image grouped through bundle processing is displayed as a single message unit, a size of a corresponding thumbnail is smaller than a size of images sent as individual messages. To verify an image included in the image message, a method of entering a separate detail screen by selecting a corresponding thumbnail is used in the art. The example embodiment refers to a method of minimizing a screen transition without leaving a chatroom and may provide a detailed image by changing a view mode of an image message.

Figure 5:
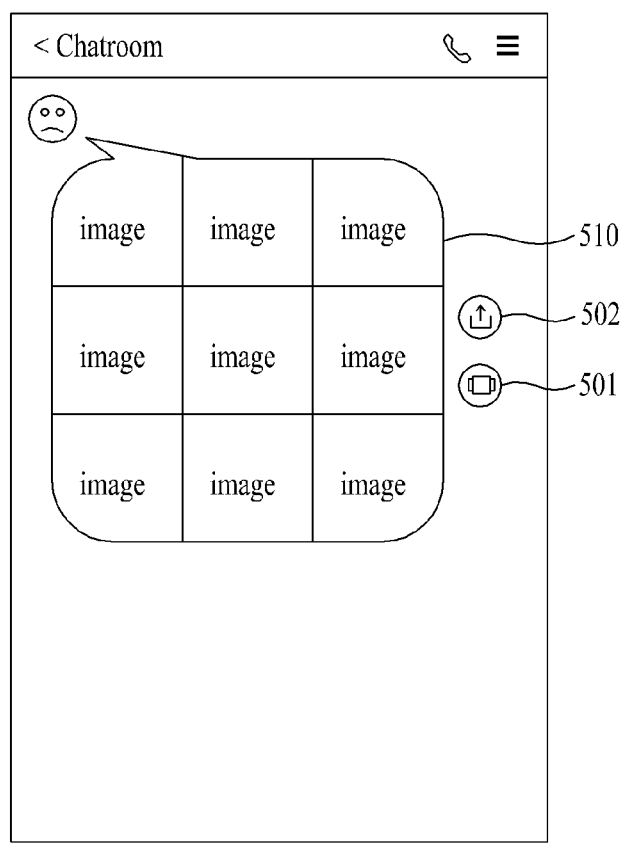
FIGS. 5 to 7 illustrate examples of an image message display process according to at least one example embodiment.
Figure 6:
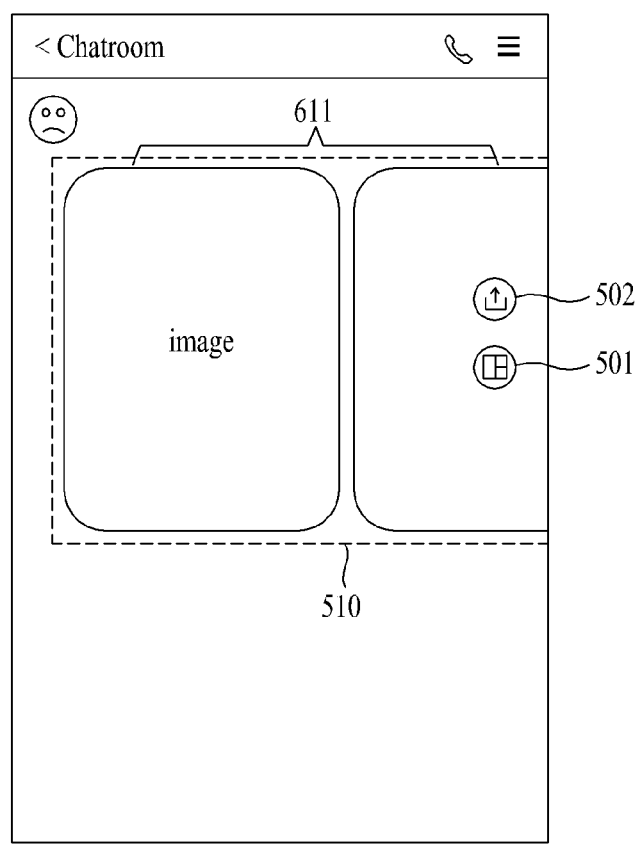
Figure 7:
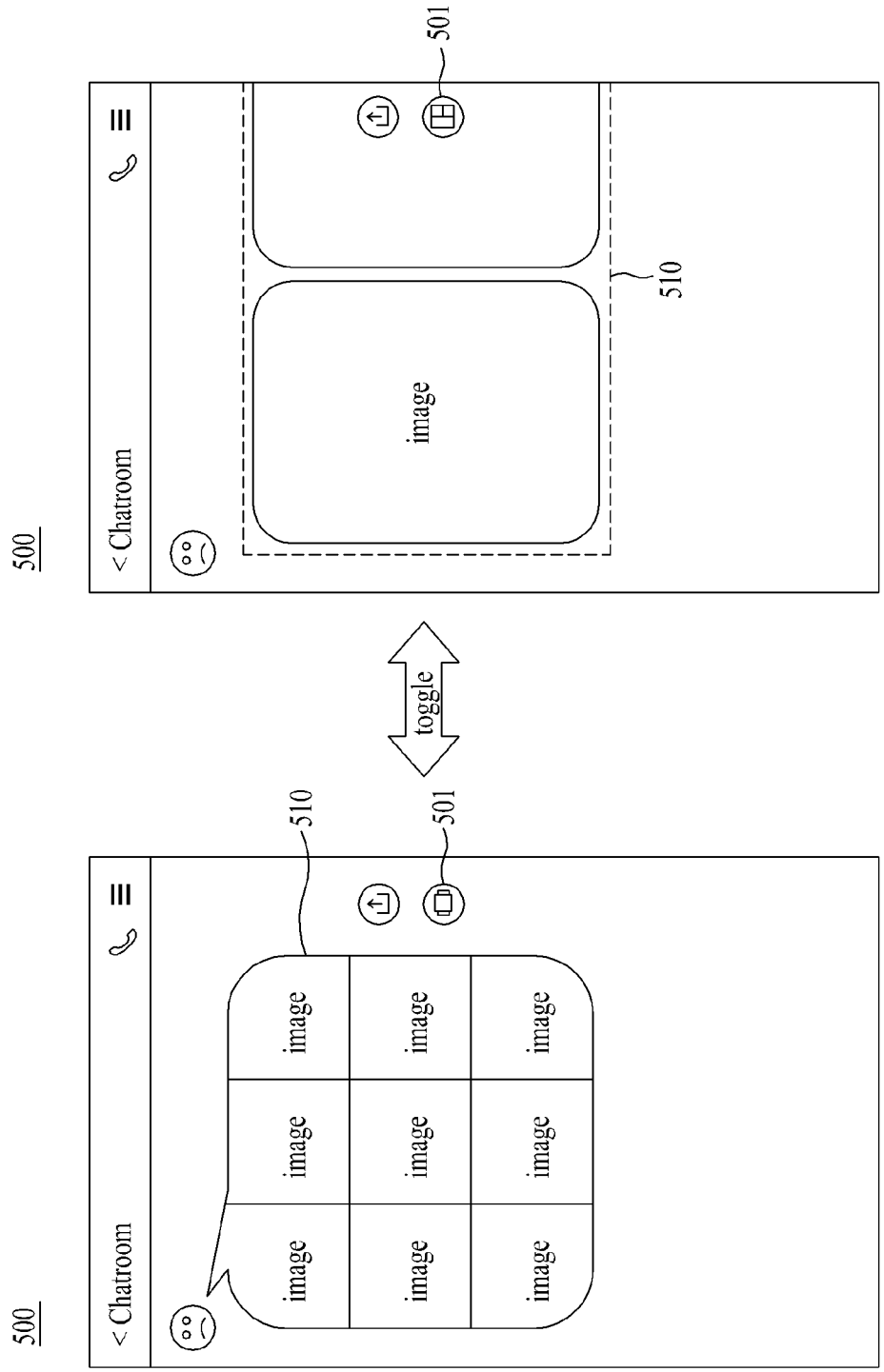

FIGS. 5 to 7 illustrate examples of an image message display process according to at least one example embodiment.

FIGS. 5 to 7 illustrate a chatroom 500 of a messenger executed on a client device that is an electronic device of a user.

Referring to FIG. 5, when sending and receiving an image message 510 including a plurality of grouped images through the chatroom 500, the processor 220 may display the image message 510 in a grid mode by configuring a layout of a message UI in a grid form and by arranging a thumbnail of each image in a grid-form layout.

A toggle button 501 may be provided to allow a user to request to switch a view mode of the image message 510. The toggle button 501 may be presented for view mode switching, and the user request may be performed through the toggle button 501. The toggle button 501 may operate as a button to switch from the grid mode to a carousel mode, or from the carousel mode to the grid mode.

In addition to the toggle button 501 for switching the view mode of the image message 510, a share button 502 for sharing the image message 510 may also be provided.

Referring to FIG. 6, when a user clicks the toggle button 501 in a state in which the image message 510 is displayed in a grid mode, the processor 220 may switch a view mode of the image message 510 to a carousel mode. The processor 220 may display the image message 510 in the carousel mode by configuring a layout of a message UI in a carousel form and by horizontally arranging an original image 611 (or an enlarged image of a thumbnail) instead of the thumbnail.

Here, in a state in which the image message 510 is displayed in the carousel mode, the toggle button 501 may operate as a button to switch from the carousel mode to the grid mode.

The user may verify the original images 611 as a detailed image of the thumbnail by simply changing a view mode of the image message 510 without a screen transition.

Referring to FIG. 7, in response to a user request for changing the view mode via the toggle button 501, the processor 220 may repeatedly switch between the grid mode and the carousel mode as the view mode of the image message 510.

In an initial stage of displaying the image message 510 immediately after processing the image message 510 that is received or sent through the chatroom 500, or a user reenters the chatroom 500, the image message 510 is displayed in a default view mode. A default for a view mode may be defined according to system settings or may be determined according to user settings. For example, immediately after sending and receiving the image message 510 or when the user leaves and then reenters the chatroom 500 in a state in which the view mode of the image message 510 is set to the carousel mode, the image message 510 may be displayed in the carousel mode.

As another example, a last view mode for the image message 510 may be stored and the image message 510 may be displayed by applying the corresponding view mode in response to re-entry into the chatroom 500. Immediately after sending and receiving the image message 510, the image message 510 may be displayed in the grid mode. In the case of storing a last view mode according to switching a view mode for each image message 510 and then leaving and reentering the chatroom 500, the image message 510 may be displayed in a previous last view mode.

In the case of the image message 510 included in the chatroom 500, the same display method may apply to an outgoing message as well as an incoming message.

Figure 8:
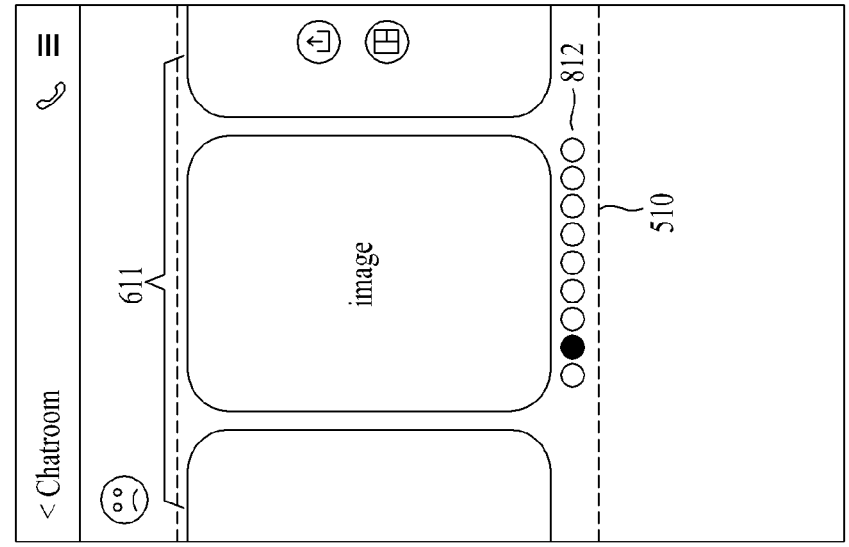
FIGS. 8 and 9 illustrate examples of scrolling in a carousel mode of an image message according to at least one example embodiment.
Figure 8:
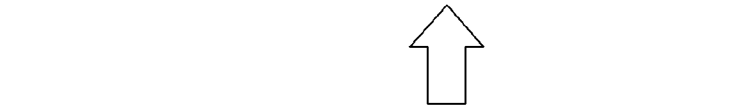
Figure 8:
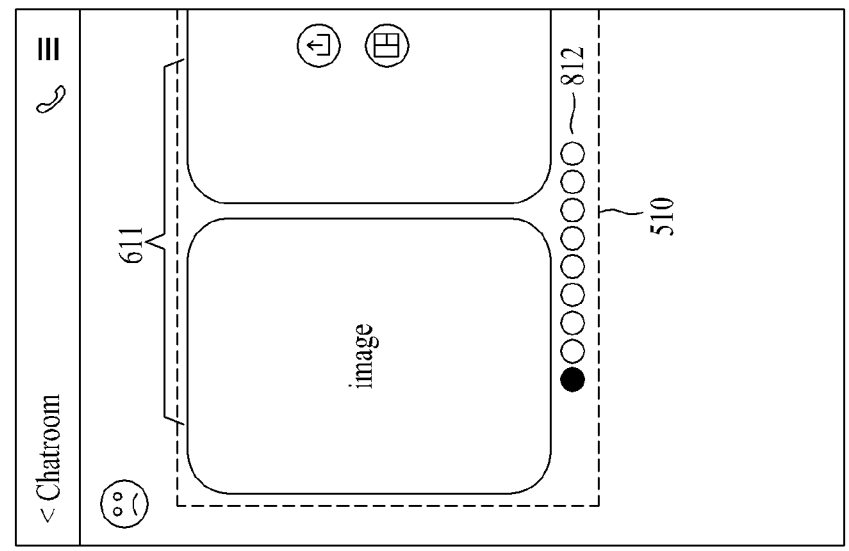
Figure 9:
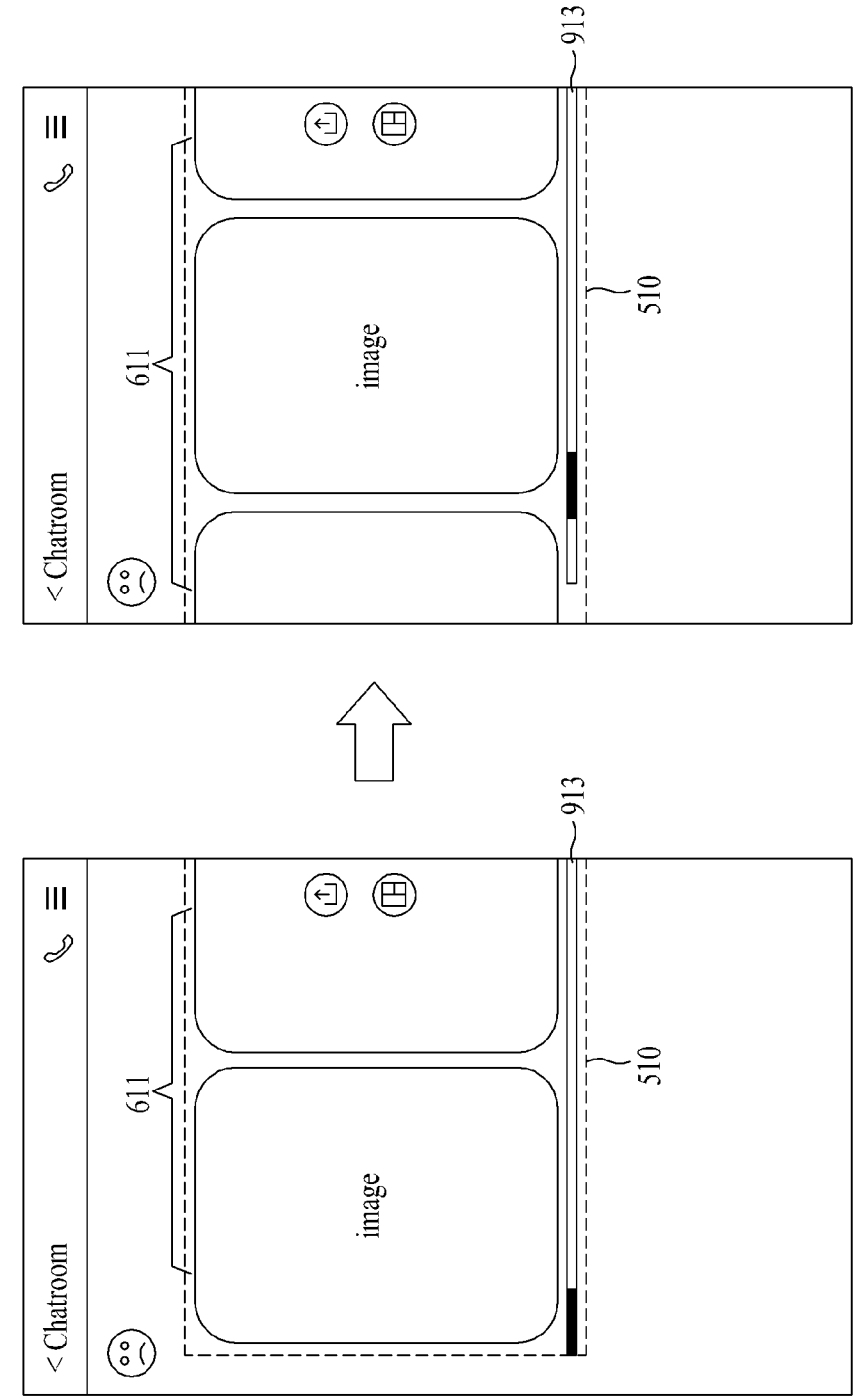

FIGS. 8 and 9 illustrate examples of scrolling in a carousel mode of an image message according to at least one example embodiment.

Referring to FIGS. 8 and 9, when the image message 510 is displayed in the carousel mode, a scroll indicator 812, 913 for a movement between the original images 611 may be included in a carousel-form layout.

The processor 220 may show a degree of scrolling according to an image displayed in a reference area among the entire images that belong to the image message 510 through the scroll indicator 812, 913.

The processor 220 may provide a scroll function for the original images 611 in response to a swipe action of the user. Here, every time a swipe action is input, the processor 220 may scroll the original images 611 one by one regardless of a size of a user input.

Depending on example embodiments, the processor 220 may scroll a plurality of original images 611 by applying an input size of a swipe action.

Therefore, in the case of switching the view mode of the image message 510 to the carousel mode, the processor 220 may provide view details for the image message 510.

According to some example embodiments, it is possible to provide a plurality of view modes for a message including images grouped through batch processing and to display an image message in a mode according to a user selection between a grid mode and a carousel mode without a screen transition in a chatroom.

The apparatuses described above may be implemented using hardware components, software components, and/or a combination of hardware components and software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, or in a propagated signal wave capable of providing instructions or data to or being interpreted by the processing device. The software also may be distributed over network coupled computer devices so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image message display method implemented by a computer device comprising at least one processor configured to execute computer-readable instructions included in a memory, the image message display method comprising:
    displaying a plurality of grouped images sent and received as an image message in a chatroom as a single message unit in one mode of a grid mode in which the plurality of grouped images are displayed in a grid form with rows and columns and a carousel mode in which the plurality of grouped images are scrollable in a horizontal direction; and
    switching a view mode of the image message between the grid mode and the carousel mode in response to a user request,
    wherein the switching comprises:
        displaying a toggle button in association with the grouped images in the chatroom for toggling between the grid mode and the carousel mode, the toggle button being a first shape, and
        in response to the user request being received via the toggle button, switching said one mode of the grid mode and the carousel mode to the other mode of the grid mode and the carousel mode and changing the first shape of the toggle button to a second shape of the toggle button.

2. The image message display method of claim 1, wherein the first shape corresponds to the other mode of the grid mode and the carousel mode, and the second shape corresponds to the one mode of the grid mode and the carousel mode.

3. The image message display method of claim 1, wherein an entire portion of each of the plurality of grouped images is shown in the grid mode.

4. The image message display method of claim 1, wherein the grid mode is a view mode for displaying thumbnail images of the plurality of grouped images in the rows and columns, and the carousel mode is a view mode for displaying original images of the plurality of grouped images or enlarged images of the thumbnail images.

5. The image message display method of claim 1, further comprising:
    displaying the image message in a default view mode between the grid mode and the carousel mode in response to a user reentering the chatroom after leaving the chatroom when the image message is displayed.

6. The image message display method of claim 1, further comprising:
    storing a last view mode displayed in the chatroom for the image message; and
    displaying the image message in the last view mode between the grid mode and the carousel mode in response to reentry into the chatroom.

7. The image message display method of claim 1, wherein, in the carousel mode, a movement between the plurality of grouped images according to a user input is provided by horizontally arranging the plurality of grouped images.

8. The image message display method of claim 1, wherein, in the carousel mode, the plurality of grouped images are scrolled regardless of an input size according to a user input.

9. The image message display method of claim 1, wherein, in the carousel mode, the plurality of grouped images are scrolled in proportion to an input size according to a user input.

10. The image message display method of claim 1, further comprising:
    displaying, in the carousel mode, a scroll indicator according to a movement between the plurality of grouped images.

11. A non-transitory computer-readable recording medium storing computer-readable instructions that, when executed by at least one processor, cause the at least one processor to perform an image message display method comprising:
    displaying a plurality of grouped images sent and received as an image message in a chatroom as a single message unit in one mode of a grid mode in which the plurality of grouped images are displayed in a grid form with rows and columns and a carousel mode in which the plurality of grouped images are scrollable in a horizontal direction; and switching a view mode of the image message between the grid mode and the carousel mode in response to a user request, wherein the switching comprises:

displaying a toggle button in association with the grouped images in the chatroom for toggling between the grid mode and the carousel mode, the toggle button being a first shape, and in response to the user request being received via the toggle button, switching said one mode of the grid mode and the carousel mode to the other mode of the grid mode and the carousel mode and changing the first shape of the toggle button to a second shape of the toggle button.

12. A computer device comprising:

at least one memory storing computer-readable instructions; and at least one processor configured to execute the computer-readable instructions to:

display a plurality of grouped images sent and received as an image message in a chatroom as a single message unit in one mode of a grid mode in which the plurality of grouped images are displayed in a grid form with rows and columns and a carousel mode in which the plurality of grouped images are scrollable in a horizontal direction, and switch a view mode of the image message between the grid mode and the carousel mode in response to a user request, wherein the at least one processor is further configured to display a toggle button in association with the grouped images in the chatroom for toggling between the grid mode and the carousel mode, the toggle button being a first shape, and in response to the user request being received via the toggle button, switch said one mode of the grid mode and the carousel mode to the other mode of the grid mode and the carousel mode and change the first shape of the toggle button to a second shape of the toggle button.

13. The computer device of claim 12, wherein the first shape corresponds to the other mode of the grid mode and the carousel mode, and the second shape corresponds to the one mode of the grid mode and the carousel mode.

14. The computer device of claim 12, wherein an entire portion of each of the plurality of grouped images is shown in the grid mode.

15. The computer device of claim 12, wherein the grid mode is a view mode for displaying thumbnail images of the plurality of grouped images, and the carousel mode is a view mode for displaying original images of the plurality of grouped images in the rows and columns or enlarged images of the thumbnail images.

16. The computer device of claim 12, wherein the at least one processor is further configured to display the image message in a default view mode between the grid mode and the carousel mode in response to a user entering the chatroom after leaving the chatroom when the image message is displayed.

17. The computer device of claim 12, wherein the at least one processor is configured to:

store a last view mode displayed in the chatroom for the image message, and display the image message in the last view mode between the grid mode and the carousel mode in response to reentry into the chatroom.

18. The computer device of claim 12, wherein, in the carousel mode, a movement between the plurality of grouped images according to a user input is provided by horizontally arranging the plurality of grouped images.

19. The computer device of claim 12, wherein, in the carousel mode, the plurality of grouped images are scrolled in proportion to an input size according to a user input.

20. The computer device of claim 12, wherein the at least one processor is further configured to execute the computer-readable instructions to display a scroll indicator according to a movement between the plurality of grouped images are in the carousel mode.

* * * * *